Figure 1:
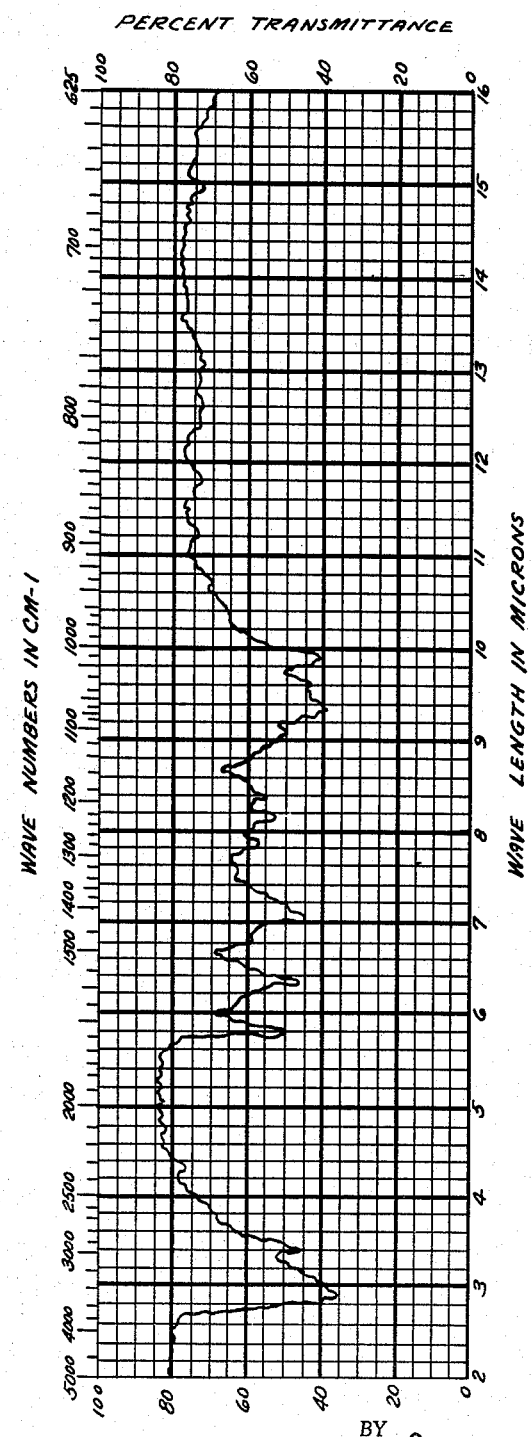

INVENTORS
JACOB W. DAVISSON
FRED W. TANNER, JR.
ALEXANDER C. FINLAY
JASPER H. KANE

United States Patent Office 2,963,401
Patented Dec. 6, 1960

2,963,401
RIMOCIDIN AND METHODS FOR ITS RECOVERY

Jacob W. Davisson, Levittown, Fred W. Tanner, Jr., Baldwin, Alexander C. Finlay, Flushing, and Jasper H. Kane, Garden City, N.Y., assignors to Chas. Pfizer & Co., Inc., Brooklyn, N.Y., a corporation of Delaware Filed June 1, 1956, Ser. No. 588,788

18 Claims. (Cl. 167—65)

This invention relates to the recovery of a new antibiotic called rimocidin, which is particularly active against a variety of fungi pathogenic to both plants and animals. The invention includes within its scope the concentration and purification of rimocidin, as well as both concentrated and refined forms of the new antibiotic.

Fungal infections have always been a serious problem in the agricultural and industrial fields. Many agents have been proposed for the control of the various fungi that cause these problems, but most of these have had a very limited success. Their failures are usually due to activity against but a limited number of these organisms, low activity or inability to cope with resistant forms of the organisms which arise. Many of the proposed agents have been used to a limited extent or have been abandoned completely.

The main object of our invention is to provide an effective anti-fungal agent that is not subject to the foregoing drawbacks. This object has been attained by the discovery and recovery of a hitherto unsuspected antibiotic that is simultaneously produced in a known fermentation process heretofore employed for the production of a different antibiotic.

We have found that during the formation of oxytetracycline (also known by the registered trademark Terramycin) by the growth of various strains of *Streptomyces rimosus*, such as deposited strains NRRL 2234 and ATCC 12313, on suitable culture media, as is described in the U.S. Patent 2,516,080, issued July 18, 1950, to Ben A. Sobin, Alexander C. Finlay and Jasper H. Kane, there is simultaneously formed a distinctly different antibiotic, which we have called rimocidin. This additional antibiotic which we have separated from oxytetracycline and prepared in dry, crystalline refined form, is highly active against a wide variety of pathogenic fungi. Not only is its activity great, but we have found that there is little tendency for resistant forms of the microorganisms to develop after repeated exposure to our compound.

A comparison of the activity of our compound against various microorganisms has shown that it is quite distinct from oxytetracycline and from any of the other antibiotics that have been reported from time to time in the literature including fungicidin (Nystatin), from which rimocidin is clearly differentiated on the basis of physical, chemical and biological properties. Crystalline rimocidin, when tested against a group of 21 pathogenic fungi, showed considerable activity. These tests were carried out by adding various amounts of the antibiotic to Mycophil agar medium at 50° C. The material was poured into tubes and these were allowed to harden as slants. The organisms tested were streaked on the surface of the agar and the tubes were incubated at 28° C. for 15 days. The following table gives the results of these tests. + indicates growth of the microorganism at the specific concentration of rimocidin in agar (micrograms/milliliter); − indicates no growth at the level tested; ± indicates doubtful growth.

TABLE I

| Pathogenic Fungi | Rimocidin Concentration | | |
|---|---|---|---|
| | 1 | 5 | 10 |
| *Histoplasma capsulatum* | + | − | − |
| *Blastomyces brasiliensis* | + | − | − |
| *Blastomyces dermatitidis* | + | ± | − |
| *Trichophyton sulfureum* | + | ± | − |
| *Sporotrichum schenckii* | + | − | − |
| *Hormodendrum campactum* | + | − | − |
| *Cryptococcus compactum* | + | ± | ± |
| *Phialophora verrucosa* | ± | − | − |
| *Trichophyton violaceum* | + | − | − |
| *Candida albicans* | + | − | − |
| *Botrytis cinerea* | + | [1] ND | − |
| *Ceratostomella ulmi* | + | ND | − |
| *Rhizoctonia solani* | + | ND | − |
| *Verticillium albo-atrium* | + | ND | − |
| *Glomerella cingulata* | + | ND | − |
| *Phoma betae* | + | ND | − |
| *Alternaria solani* | + | ND | − |
| *Fusarium lycopersici* | + | ND | − |
| *Helminthosporum victoriae* | + | ND | − |
| *Sclerotinia fructicola* | + | ND | − |
| *Colletotrichum circinans* | + | ND | − |

[1] Not determined.

Our new antibiotic may be recovered from a harvested oxytetracycline fermentation broth which is prepared in accordance with the directions of the above cited patent. This may be accomplished in a variety of ways, either before or after the recovery of oxytetracycline, but preferably after. In one method of recovery of oxytetracycline the fermentation broth is filtered under acidic conditions, adjusted to a basic pH, and is then extracted with butanol. The butanol is, in turn, extracted with dilute mineral acid to recover oxytetracycline as an aqueous concentrate. If the exhausted butanol from the above process is neutralized and treated with several volumes of a non-polar, hydrophobic organic solvent, such as hexane, petroleum ether, ethyl ether, octane, heptane, pentane, and the like, an aqueous concentrate of our new antibiotic will separate from the mixture of solvents. The concentrate so obtained may be used as such for treatment of the various fungal infections, or it may be reduced to a stable, dried preparation, as by drying under vacuum from the frozen state. Preparations of higher purity are obtained by treating the butanol from which the oxytetracycline has been extracted with a decolorizing agent, such as activated carbon. This should be done in the presence of water and before treating the butanol with a low boiling petroleum fraction. Such treatment serves to remove various inert impurities and colored materials which tend to separate from the mixed solvents with our new antibiotic and thus reduce its purity.

Not only does the solution obtained during the fermentation contain this new antibiotic, but it has been found that further material may be recovered by extracting the filtered *S. rimosus* mycelium, preferably under substantially neutral conditions, i.e. pH 5 to 8. In fact, ground, dried mycelium may itself be employed to advantage, along with filter aids such as diatomaceous earth, if it is rapidly neutralized after its recovery from the fermentation broth. The mycelium cake produced in the production of oxytetracycline rapidly loses rimocidin potency if this precaution is not taken. Extraction of the mycelium may best be done by suspending the wet mycelium in an alcohol-type solvent, such as methanol, ethanol, propanol, isopropanol, and the butanols, and agitating for a short time. The mycelium is then filtered again and the alcohol-type solvent is found to be enriched in the antibiotic.

Rather than separating our new antibiotic from its solutions in alcohol by treatment with low boiling petroleum fractions, the alcohol solutions may be concentrated in a vacuum at a moderately elevated temperature, say 20 to 50° C., to yield a concentrate of pronounced anti-fungal activity. In such a procedure, it is desirable to have some water present in the alcohol at all times. For example, during the distillation of wet butanol, there is a tendency towards dehydration of the residual butanol in the still pot due to distillation of a water-rich butanol-water azeotrope. Under these conditions our new antibiotic tends to precipitate in an anhydrous form, sometimes difficult to redissolve. This may be avoided by maintaining an appreciable amount of water in the butanol at all times, preferably by the presence of a separate water layer. After the butanol is completely or substantially completely removed, the concentrate may be used directly for the treatment of fungus infections, or it may be further purified, or it may be reduced to a dried state.

Solutions, such as the fermentation broths from which oxytetracycline has been removed as a complex bivalent metal salt by treatment with soluble barium salts or with various other bivalent metal salts in accordance with the directions in the copending patent application Serial No. 165,588, filed July 1, 1950, filed by Stanley W. Ensminger, Peter P. Regna, William E. Stieg and Albert E. Timreck, and now abandoned, may be treated to recover our new antibiotic. One method of accomplishing this is by adsorption of the active material on an adsorbant, such as an activated carbon. The new antibiotic may be eluted therefrom with certain solvents, preferably containing some water. Examples of suitable solvents are lower aliphatic alcohols having from 1 to 4 carbon atoms, pyridine, and other organic bases such as triethylamine, triethanolamine and the like. From the wet solvent an aqueous concentrate of the antibiotic is obtained by treatment with a low boiling petroleum fraction. The aqueous concentrate then may be treated as described above. The fermentation broth from which oxytetracycline has been removed by precipitation as complex bivalent metal salts, may be spray dried, or concentrated under vacuum and spray dried to yield a solid preparation. There is little or no loss of the new antibiotic during such processing of the broth.

In addition to the treatment of butanol solutions containing rimocidin with activated carbon to remove various impurities, we find that washing the butanol solution with dilute acids or dilute alkalies serves to remove many of the impurities and yet removes little or none of the new antibiotic. Recovery of the antibiotic from butanol solutions treated in this manner results in dried products or in concentrates of higher purity and lighter color. In general, materials prepared in this manner are particularly acceptable. Various impurities may be removed from the rimocidin solutions, particularly from concentrated aqueous solutions thereof, by treatment with materials capable of removing anions and cations by exchange reactions. Examples of such materials are the synthetic ion-exchange materials, Amberlite IR4B (a polyamine-formaldehyde condensation product), Amberlite IR100 (a sulfonated phenol formaldehyde resin), Amberlite IRC50 (methacrylic acid copolymerized with a minor proportion of divinyl benzine), and the like. Synthetic inorganic ion-exchange materials, such as permutite (a zeolite), and various derived natural materials, such as sulfonated coals and sulfonated humic acid may also be used. The resulting solutions have a very light color and yield dried materials of good quality.

Other concentration and purification procedures that are applicable to rimocidin have been found. Thus, the antibiotic may be precipitated from the crude aqueous solutions in which it occurs by the addition of various water-soluble inorganic salts. For example, the addition of sufficient ammonium sulfate to give a half-saturated solution or sufficient sodium chloride to give a completely saturated solution will cause the active material to separate. These salts may be separated from certain materials of high molecular weight, such as proteinaceous materials, by dialysing its crude aqueous solutions through cellophane.

Although the various steps described above may be used in various combinations to obtain concentrated and purified rimocidin, we prefer to use a process having the following sequence of steps. The oxytetracycline-exhausted butanol solution heretofore discarded in the preparation of oxytetracycline, is washed twice with one-quarter its volume of a one percent sodium bicarbonate solution to remove residual acidic materials. The washed butanol solution is then treated with one-half its volume of water, and the butanol is concentrated under vacuum to a small volume. Water is added from time to time, as required, to maintain a water-saturated butanol solution. The wet butanol concentrate is treated with about five volumes of petroleum ether. The resulting aqueous layer is separated, and the butanol-petroleum ether mixture is washed with one or two small portions of water. The aqueous layers are combined and are then treated with Amberlite IR100, with Amberlite IR4B or preferably with a mixture of these, either in a column or by a batch process. The aqueous solution is then reduced to a dried product by subjecting it to a vacuum while in the frozen state.

Crystalline rimocidin may be obtained by further purification. For instance, butanol extracts containing the antibiotic either obtained from the filtered fermentation broth or by extraction of mycelium may be washed with dilute caustic, with acid and with water to obtain a purified solution. Upon concentrating the organic solvent solution, preferably in the presence of water, until a suitable concentration is obtained, the antibiotic may be separated in crystalline form. After filtering off the crystalline material, it may be dried and used in its purified form. However, a still more highly purified material may be obtained by recrystallization of this product. For instance, it has been found that crystalline rimocidin may be dissolved in a lower alcohol, such as methanol, in the presence of an organic amine sulfate, such as triethylamine sulfate. Upon addition of acetone, a crystalline rimocidin-triethylamine sulfate mixed salt precipitates. This salt may be converted to rimocidin sulfate by dissolving the same in methanol and adding water to the resulting solution, which causes rimocidin sulfate to precipitate. The sulfate salt in turn may be converted to rimocidin by treatment with sodium hydroxide in methanol.

Rimocidin is an amphoteric substance which forms salts with both acids and bases. Thus metallic salts of the new antibiotic may also be prepared. It is generally necessary to carry out the formation of these salts from the antibiotic itself in a solvent and preferably in one of the lower alcohols. Methanol is the most useful of these solvents. If a product of high purity is used as starting material, crystalline metallic salts, such as the sodium, potassium, barium and calcium salts may be obtained. The crystalline sodium salt is prepared by treating a methanol solution of crystalline rimocidin with the proper amount of sodium hydroxide.

Our new antibiotic rimocidin may be assayed by determining the effect of a sample of known weight upon a standard culture of *Trichophyton gypseum*. This utilizes the method of serial dilution and the potency of our preparations is expressed in terms of Trichophyton dilution units (TDU). This unit is the maximum volume of solution, expressed in milliliters, to which 1 milligram of the particular rimocidin preparation may be diluted, and which will inhibit a standard *Trichophyton gypseum* culture in Sabaroud's broth when incubated 72 hours at 28° C.

However, a second and preferred method of assay for rimocidin is by means of a standard culture of a yeast, *Saccharomyces cerevisiae*, which is used in an agar plate assay method. In accordance with this method, pure rimocidin (base) is arbitrarily assigned a potency of 1000 $\mu$/mg. This is equivalent to about 200 TDU/mg. Rimocidin sulfate, which is used as a reference standard in this test, is calculated to have 908 μ/mg. of rimocidin activity. Agar plates, seeded with a one percent, 18-hour broth culture of S. cerevisiae, are prepared for the assay. Then aqueous solutions containing known concentrations of the standard rimocidin sulfate are used to impregnate paper discs which are dried and placed on the agar plates. The rimocidin of unknown potency is also put in solution to prepare similar discs which are also placed on the plates. The agar plates are then incubated at 37° C. overnight and the zone of inhibition surrounding each disc is measured and plotted on a curve. In this manner the rimocidin content of the unknown sample is readily calculated in relation to the standard sample of rimocidin sulfate.

The present invention embraces both pure crystalline rimocidin and crude forms thereof, having an order of potency above that which occurs in the production of oxytetracycline by the cultivation of S. rimosus. Thus, it is intended to include within the scope of the invention solid rimocidin-containing materials having a potency of from about 20 to 1000 μ/mg. on a dry basis.

The physical properties of crystalline rimocidin and its sulfate salt have been determined, and these are set forth in the following table:

TABLE II
*Physical properties of rimocidin and rimocidin sulfate*

Figure 2:
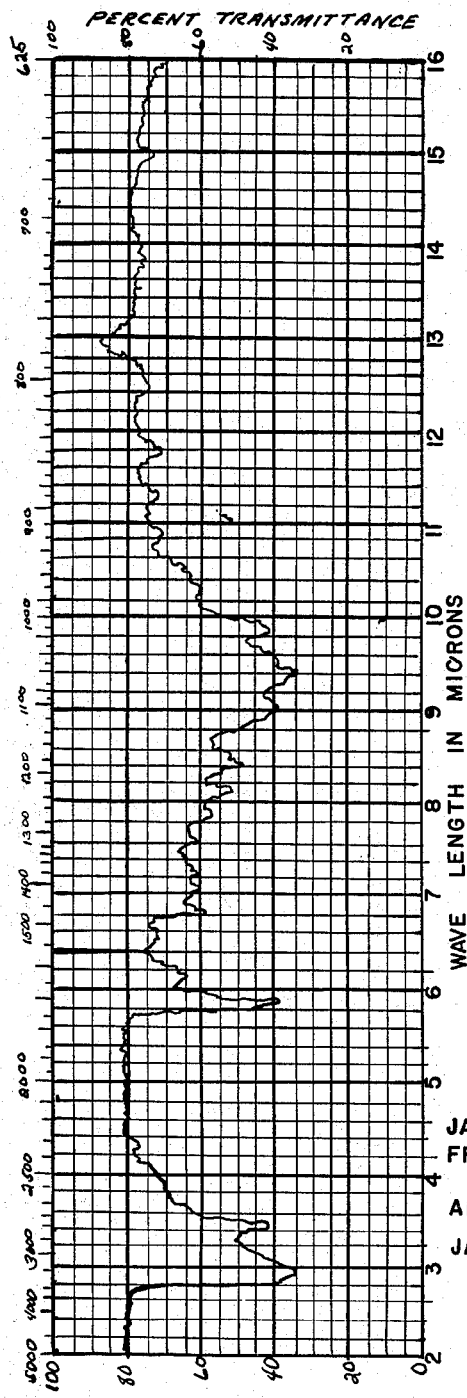

| Property | Rimocidin | Rimocidin Sulfate |
|---|---|---|
| | Cm-1 | Cm-1 |
| Infrared Absorption Maxima (In potassium bromide pellet) the infrared absorption spectra are shown in the attached drawings (Figs. 1 and 2) | 3,413<br>2,941<br>1,718<br>1,631<br>1,575<br>1,471<br>1,416<br>1,389<br>1,326<br>1,277<br>1,230<br>1,194<br>1,099<br>1,071<br>1,040<br>1,007<br>890<br>847<br>806<br>794 | 3,390<br>2,924<br>1,712<br>1,698<br>1,534<br>1,466<br>1,414<br>1,383<br>1,323<br>1,269<br>1,232<br>1,193<br>1,176<br>1,110<br>1,015<br>972<br>918<br>885<br>850 |
| | 80% methanol-water | 80% methanol-water |
| | $\lambda^{m\mu}_{max.}$ / $\epsilon^{1\%}_{1\,cm.}$ | $\lambda^{m\mu}_{max.}$ / $\epsilon^{1\%}_{1\,cm.}$ |
| Ultraviolet Absorption | 279 / 333<br>291 / 651<br>303 / 1,001<br>318 / 918 | 278 / 347<br>290 / 666<br>303 / 1,024<br>318 / 937 |
| Optical Activity (in pyridine, C, 1%) | +116° | +72.3° |
| Melting Point (Culatti Apparatus) | decomposes above 110° C. | 137–140° C. |
| Analyses: | | |
| Carbon | 60.43 | 57.83 |
| Hydrogen | 7.93 | 7.93 |
| Nitrogen | 1.94 | 1.83 |
| Oxygen (by difference) | 29.70 | 30.35 |
| Sulfur | | 2.06 |
| Neutral Equivalent | 826–840 | 889 |
| Solubility: | | |
| slightly soluble in | water, methanol, ethanol, acetone | water |
| soluble in | butanol, dimethylformamide, pyridine | methanol, ethanol, acetone, dimethylformamide, pyridine |
| insoluble in | hexane, petroleum ether | hexane, petroleum ether |

The present application is a continuation-in-part of our application Serial No. 229,376, filed June 1, 1951, which in turn is a continuation-in-part of Serial No. 170,478, filed June 26, 1950, both of said applications being abandoned. Rimocidin is the same antibiotic therein designated as "P.A. 85".

The following examples are given by way of illustration and are not intended to limit the scope of our invention to the details set forth therein.

The butanol extracts used in the following Examples I, II, and III were obtained from oxytetracycline fermentation broth produced in accordance with U.S. Patent No. 2,516,080, by acidifying the whole broth, filtering the mycelium, adjusting the pH of the filtrate to about 9, extracting it with butanol and then extracting the butanol solution with dilute mineral acid to remove the oxytetracycline.

EXAMPLE I

One liter of oxytetracycline-depleted butanol extract was treated with five volumes of petroleum ether. The aqueous layer that separated upon standing for a short time was withdrawn and the combined solvents were washed with two small portions of water. The combined aqueous layers were frozen and subjected to vacuum drying. The product consisted of a brown powder which assayed 20 μ/mg. (4 TDU/mg.).

EXAMPLE II

A sample of the butanol extract used as starting material in Example I was treated with a weight of Darco G60 (a decolorizing carbon) equal to 3% of the volume of butanol. A volume of water equal to one-half of that of the butanol was added and the mixture was stirred for one-half hour. After filtration, the aqueous layer was separated and discarded and the clear butanol phase was treated with petroleum ether. The rest of the procedure was just as in Example I. In this case the product consisted of a pale yellow powder assaying 100 μ/mg. (20 TDU/mg.).

EXAMPLE III

Five gallons of a butanol extract from which the oxytetracycline had been removed with dilute aqueous acid was washed twice with one-quarter of its volume of a one per cent sodium bicarbonate solution. The aqueous washes were discarded. To the butanol was then added one-half its volume of water, and the mixture was subjected to vacuum distillation adding water from time to time. The concentrated wet butanol was separated from an aqueous layer, and was then treated with five volumes of petroleum ether. The aqueous concentrate which formed was separated from the mixed solvent layer, and the solvents were washed with two small portions of water. The combined aqueous layers were dried from the frozen state yielding 75 g. of a dark brown powder assaying 110 μ/mg. (22 TDU/mg.).

EXAMPLE IV

Six liters of oxytetracycline fermentation broth from which the oxytetracycline had been removed by treatment with a mixture of barium chloride and magnesium chloride, as described in the above mentioned copending patent application Serial No. 165,588, were treated with 12 grams of activated carbon (Nuchar C190). The mixture was stirred for fifteen minutes and the carbon was filtered. The moist carbon was stirred with 600 milliliters of 85 percent butanol. The carbon was again removed by filtration and to the filtrate was added five volumes of hexane. The aqueous layer that formed was separated and the butanol-hexane mixture was washed with a small volume of water. The two aqueous layers were dried from the frozen state under vacuum. The product weighed 250 milligrams and was shown to be active in the *Saccharomyces cerevisiae* and *Trichophyton gypseum* assays.

EXAMPLE V

Six liters of oxytetracycline-depleted fermentation broth of the same type used in Example IV was treated with 12 grams of activated carbon (Nuchar C190). After stirring for fifteen minutes the carbon was filtered. The moist carbon was stirred with 600 milliliters of 80 percent pyridine for a short time. The carbon was again filtered. Five volumes of ethyl ether was added. The aqueous layer that formed was separated, and the organic phase was washed with a small volume of water. The two water layers were combined and dried from the frozen state. The product obtained in this manner weighed 2.0 grams and had a potency of 25 $\mu$/mg. (5 TDU/mg.).

EXAMPLE VI

An oxytetracycline fermentation broth, prepared by the growth of *Streptomyces rimosus* in a nutrient medium was adjusted to about pH 2.5. The solid mycelium was filtered and the oxytetracycline activity was precipitated from the filtrate by adding a mixture of long-chain quaternary ammonium salts ("Arquad C") and raising the pH to 8.5. After filtering the precipitated oxytetracycline compound, the filtrate was assayed for rimocidin by means of the TDU assay. The filtrate was found to contain 400 $\mu$/ml. (80 TDU/ml.). No appreciable potency was lost during the precipitation of the oxytetracycline.

EXAMPLE VII

Filtered broth, obtained by filtering the mycelium from the growth of *Streptomyces rimosus* in a nutrient medium, was extracted at pH 10 with butanol. The butanol extract was washed with 0.1 normal sodium hydroxide solution. The organic phase was concentrated to one-eighth volume, 10% by volume of water was added, and the pH was adjusted to about 5 with phosphoric acid. Oxytetracycline separated and was filtered. The butanol filtrate was found to contain 3167 micrograms of rimocidin per milliliter.

EXAMPLE VIII

The oxytetracycline mycelium obtained from 500 gallons of whole oxytetracycline broth produced by the growth of *Streptomyces rimosus* in a nutrient medium was stirred for an hour with 750 gallons of butanol. The mixture was filtered and the cake was stirred for a short time in 250 gallons of butanol. The butanol extracts were combined and washed successively with 0.1 normal sodium hydroxide, 0.1 normal hydrochloric acid and then with water. The washed butanol solution was then concentrated under vacuum with continual addition of water to approximately one-tenth its original volume. Water addition was discontinued and sufficient butanol-water azeotrope was removed to dry the remaining solution. The crude rimocidin product was filtered from the butanol. Fifteen hundred grams of this crude crystalline material was dissolved in 12 liters of methanol containing 4.8 liters of a 50% methanolic solution of triethylamine sulfate. The solution was filtered to remove residual undissolved material and three volumes of acetone were added. The crystalline rimocidin-triethylamine sulfate salt separated in fine, hair-like needles. Some of these were formed in clusters. 525 grams of a product assaying about 800 $\mu$/mg. was obtained.

EXAMPLE IX

Ten grams of a rimocidin-triethylamine sulfate salt prepared as in Example VIII (570 $\gamma$/mg.) was dissolved in 200 ml. of methanol, treated with Darco G-60 carbon and filtered. Water (200 ml.) was added, and the resulting solution was allowed to crystallize at 25° C. for 2 hours. The rimocidin sulfate was filtered, washed with 1-1 water-methanol and dried in vacuo over calcium chloride; weight 5.7 grams; potency 830 $\gamma$/mg.; M.P. 149–150° (dec.). Five grams were recrystallized from 40 ml. of methanol by the addition of 40 ml. of water, as above; weight 4.4 grams; potency 925 $\gamma$/mg. (theory—908 $\gamma$/mg.); M.P. 149–150° (dec.); $[\alpha]_D^{25}=+75°$ ($c=1\%$ in methanol).

EXAMPLE X

Rimocidin sulfate (9.96 grams) was dissolved in 700 ml. of 80% methanol. The calculated amount of $BaCl_2.2H_2O$ (1.285 grams) in 8.8 ml. of water was added, and the precipitated barium sulfate was removed by filtration and washed with 80% methanol. The calculated quantity of sodium hydroxide (0.418 gram) in methanol was added, and the methanol was removed in vacuo under nitrogen. The resulting crystals were centrifuged, washed with water and dried under vacuum over calcium chloride; weight 7.7 grams; potency 950 $\gamma$/mg. The rimocidin was dried for 2 hours in vacuo at 56° to constant weight for analysis (volatile 8.50%). *Analysis.*—Found: C, 60.43; H, 7.93, N, 1.93.

EXAMPLE XI

Rimocidin sulfate was also prepared by treating rimocidin base in methanol with sulfuric acid. Rimocidin (1.0 gram) was suspended in 10 ml. of methanol, and 1.5 ml. of 1 N sulfuric acid in methanol (.072 gram) was added, which dissolved the rimocidin. Water (10 ml.) was then added, and the solution was stored at 5° for several hours. The clusters of large, rectangular plates of rimocidin sulfate were filtered, washed with methanol-water and dried in vacuo over calcium chloride; weight 0.8 gram; potency 880 $\gamma$/mg.; M.P. 151° (dec.). For analysis, the antibiotic sulfate was dried in vacuo at 56° for 2 hours (volatile, 6.52%). *Analysis.*—Found: C, 57.48, 57.83; H, 7.93, 7.70; N, 1.78, 1.83; S, 2.06, 1.91. Rimocidin sulfate, which occurs as a hydrate containing about three molecules of water, is soluble in methanol and in acetone, from which solutions it is precipitated by the addition of water.

EXAMPLE XII

Rimocidin (1.0 gram) was suspended in 10 ml. of methanol. Fifteen ml. of methanol, containing 0.06 gram of sodium hydroxide, was added slowly. The antibiotic partially dissolved (never completely clear) and then crystallized as its sodium salt. After one hour, the sodium rimocidin was centrifuged, washed with methanol and dried in vacuo over calcium chloride; weight 0.8 gram; potency 880 $\gamma$/mg. *Analysis.*—Found: C, 58.96; H, 7.54; N, 2.05, 1.97; Na, 2.78; $([\alpha]_D^{25}=-40.1°$ (c., 1% in water)).

EXAMPLE XIII

Rimocidin (1.5 grams) was dissolved in 60 ml. of methanol containing 20 ml. of 1.65% (v./v.) aqueous hydrochloric acid. The resulting solution was treated with a small amount of Darco G-60 carbon, and then the methanol was removed under vacuum. The crystalline rimocidin hydrochloride was centrifuged, washed with 0.1 N aqueous hydrochloric acid, n-butanol, and finally acetone and dried in vacuo over calcium chloride: weight 0.3 gram. *Analysis.*—Cl, 3.76, 3.79.

Various forms of rimocidin have been extensively tested for both agricultural and industrial purposes, and found to be highly useful in combatting fungi. In one series of tests, rimocidin, in the form of its sulfate salt, was screened, along with many commercially available fungicides, to determine its efficacy in protecting pine seeds against *Rhizoctonia solani* and other fungi. *Rhizoctonia solani* is responsible for much of the damage to pine, spruce and caragana seeds and seedlings in Canadian forests and nurseries. It was found that rimocidin sulfate gave control against this pathogen at a wide range of concentrations non-toxic to the species of seeds treated therewith. In fact, rimocidin was found to be the best antifungal agent of 109 chemicals screened in the tests.

In further tests, both ground mycelium containing rimocidin, and a more purified form of rimocidin were tested to determine the efficacy of rimocidin in protecting pea seeds against *Ascochyta pisi,* a fungus which is known to attack pea seeds in the Netherlands. It was found that the rimocidin in both instances penetrated into the pea seeds and exhibited fungicidal activity against *Ascochyta pisi* both in vitro and in vivo. Nearly complete control was achieved by soaking the seeds in an aqueous solution containing 100 p.p.m. of rimocidin, and substantially complete control was obtained with 200 p.p.m. The results of this work are reported in more detail by J. Dekker of the T.N.O.-Z.W.O. Research Unit for Internal Therapy of Plants, Laboratory of Phytopathology, Agricultural University, Wageningen, The Netherlands, in "Nature," vol. 175, p. 689, April 16, 1955.

In a series of tests which were conducted at the University of Maine, it was found that Rhizoctonia and Verticillium infection of potato stems was reduced considerably by applying to the plants an aqueous solution of rimocidin. Moreover, Rhizoctonia infection of lettuce in sand was considerably controlled by rimocidin; and both Rhizotonia and Verticillium infection of tomato plants were reduced considerably by this antibiotic. These results were reported by M. T. Hilborn in "Phytopathology," vol. 43, No. 9, p. 475.

In tests which were conducted at Boyce Thompson Institute for Plant Research, Inc., rimocidin was evaluated to determine its efficacy in controlling early blight of tomatoes, which is caused by the fungus, *Alternaria solani*. In these tests, tomato plants were sprayed with 2000 and 400 p.p.m. of rimocidin sulfate, allowed to dry, and then sprayed with a spore suspension of the test organism. Controls were also run. The plants were all incubated under identical conditions until the characteristic spots of early bight appeared on the controls. The spots on all plants were then counted and the percentage control of infection over the controls (which averaged 580 spots per plant) obtained by treatment with rimocidin was computed at each concentration. The results of these tests are set forth in the following table:

TABLE III
*Control of early blight of tomato*

| Agent tested | Percent control at concentration of— | |
|---|---|---|
| | 2,000 p.p.m. | 400 p.p.m. |
| Rimocidin sulfate | 99 | 98 |
| Control | 0 | 0 |

Thus, substantially complete control of the infection was obtained with 2000 and 400 p.p.m. of rimocidin.

In further tests rimocidin was evaluated for its ability to protect pea seeds and seedlings from fungal attack during germination and early growth in soil. Lots of 100 peas were dusted respectively with 0.45 and 0.15% by weight of rimocidin sulfate and planted, along with untreated controls, in flats containing soil which had been heavily infected with a Pythium species of fungi known to cause decay and damping-off of pea seeds and seedlings. The flats were incubated for 12 days, i.e., well in excess of the 4 to 6 days normally required for germination. Thereafter, the percentage emergence for each of the lots of peas was recorded. The results of these tests are set forth in the following table:

TABLE IV

| Agent tested | Percent emergence of peas at dosage (percent by wt.) | |
|---|---|---|
| | 0.45 | 0.15 |
| Rimocidin sulfate | 74 | 44 |
| Control | 27 | 27 |

It is apparent that rimocidin considerably increased emergence of the treated seeds over the controls.

The antifungal properties of rimocidin for industrial purposes were confirmed by the Wright Air Development Center. In these studies, one hundred and forty-three substances, including rimocidin, were tested for antifungal activity. The molds specified and used were *Aspergillus niger, A. terreus, Myrothecium, verrucaria,* and *chaetomium globosum.* The difficult to inhibit spores of *Alternaria solani, Helminthosporium carbonum* and *Curvularia lunata* were used for germination tests. Evaluation of antifungal action was obtained by four techniques: toxic agar in petri plates, spore germination inhibition on glass slides, impregnated cellulose pads on seeded agar, and retention of tensile strength of impregnated thread after exposure to molds. Rimocidin was found to be one of the five most active antifungal agents of the 143 tested. These tests are described in detail in WADC Technical Report 54-421.

Many unpublished reports have been received from independent investigators connected with universities, State and Federal institutions, agricultural experimental stations and other agencies throughout the world, indicating equally favorable results which have been observed in the testing of rimocidin against various pathogenic fungi of economic importance. Further tests are still in progress, and it is anticipated that many more reports and publications will in the future confirm the efficacy of rimocidin as an important antifungal agent, not only in the agricultural field but also for industrial purposes.

While rimocidin and/or its various salts may be used as such in combatting various fungi, it is advantageous in some circumstances to incorporate the same with carriers and/or diluents to facilitate application of the antibiotic for agricultural or industrial purposes. In particular the agents of this invention may be prepared in the form of sprays, emulsions, dusting powders, concentrates, and the like, wherein the rimocidin activity may range from less than 1% to as high as 95% by weight of the compositions. In the agricultural field, these preparations may be applied directly to the foliage of plants to protect the same against fungal attack; in some instances they may be applied to the soil; and they may also be applied to seeds to protect the same against phytopathogens sensitive to rimocidin. In the industrial field, they may be used as coating agents, they may be impregnated into fabrics, and they may be incorporated into paints or applied to materials such as leather to inhibit the development of fungi.

In certain preparations, as when aqueous sprays are desired, these compositions may contain a suitable wetting agent, preferably non-ionic wetting agents in powder form, and a compatible buffering agent to maintain the pH of the final spray solution at the desired level. In preparing powders or concentrates, it is preferred to employ inert, non-adsorbent carriers to facilitate proper proportioning of the ingredients and to prevent moisture absorption by the antibiotic. Suitable carriers include pyrophyllite, bentonite, talc, kaolin, various clays, and diatomaceous earth. The antibiotic may also be suspended or dissolved in waxes, resins, particularly the natural resins or gums, and it may also be incorporated in a variety of other carriers, including those frequently employed for agricultural and industrial pesticides. Such compositions may contain stabilizers, spreading agents, other antifungal and antibacterial agents, and in some instances, insecticides.

The amount and concentration of the antibiotic to be employed against a particular phytopathogen, or to be employed for industrial control of fungi will of course vary considerably. In the agricultural field the type of plant, or tree, the type of disease involved, the time of year, weather conditions and the state of development of the plant or tree are among the many factors which are to be considered. In general however, effective control of fungi sensitive to rimocidin and/or its salts is achieved by applying the antibiotic to the habitat of the pathogen or the area to be protected from fungal attack, in concentrations of from about 10 to 500 p.p.m. In the case of dusting powders, it is preferred to employ an appreciably higher concentration, say 250 to 3000 p.p.m.

The use of concentrates, is especially advantageous in providing compositions which are readily diluted with water or other diluents to form sprays, emulsions, or other compositions containing the antibiotic in approximately the concentrations set forth.

The utility of rimocidin in humans has not as yet been demonstrated.

As many apparently widely different embodiments of this invention may be made without departing from the spirit and scope hereof, it is to be understood that this invention is not limited to the specific embodiments herein described.

We claim:
1. A method for recovering rimocidin from a fermentation broth, produced by the cultivation of Streptomyces rimosus, which comprises first harvesting the oxytetracycline contained in said broth and then separating rimocidin from the oxytetracycline-depleted residue.

2. A method for recovering rimocidin from a fermentation broth, produced by the cultivation of Streptomyces rimosus, which comprises extracting said broth with butanol, removing the oxytetracycline contained in said butanol extract, and treating the exhausted butanol with a low boiling petroleum fraction.

3. A method as claimed in claim 2, wherein butanol extract is in turn extracted with dilute aqueous mineral acid to remove the oxytetracycline and the exhausted butanol is then treated with petroleum ether.

4. A method for recovering rimocidin from a fermentation broth, produced by the cultivation of a strain of Streptomyces rimosus, which comprises separating the oxytetracycline contained in said broth by precipitation in the form of a complex bivalent metal salt, filtering out the precipitate, absorbing the rimocidin contained in the filtrate on an adsorbent, and eluting it therefrom with an aqueous organic base.

5. A method for recovering rimocidin from a fermentation broth, produced by the cultivation of a strain of Streptomyces rimosus, which comprises separating the oxytetracycline contained in said broth by precipitation in the form of a complex barium salt, filtering out the precipitate, and extracting the filtrate with butanol under substantially neutral pH conditions.

6. A method of recovering rimocidin from the mycelium obtained by the growth of Streptomyces rimosus, which comprises extracting said mycelium with a lower alcohol under substantially neutral pH conditions.

7. A method as claimed in claim 7 wherein the lower alcohol is butanol and the butanol extract is washed before recovering purified rimocidin therefrom.

8. A method of recovering rimocidin from the mycelium obtained by the growth of Streptomyces rimosus, which comprises extracting said mycelium with a lower alcohol under substantially neutral pH conditions, concentrating said extract to produce a crude precipitate of rimocidin, separating and dissolving said precipitate in a lower alcohol in the presence of triethylamine sulfate, and crystallizing a triethylamine sulfate complex of rimocidin.

9. The process of claim 8 wherein the triethylamine sulfate complex of rimocidin is converted to rimocidin sulfate by dissolving said complex in methanol and adding water to the resulting solution.

10. A solid antifungal composition containing at least 20 mcg. per mg. of an agent selected from the group consisting of rimocidin, an amphoteric substance, slightly soluble in water, acetone and lower alcohols, decomposing above about 110° C., displaying maxima in the ultraviolet region of the spectrum at about 279, 291, 303, and 318 m$\mu$, when suspended in a potassium bromide pellet displaying infrared absorption maxima at about 3413, 2941, 1718, 1631, 1575, 1471, 1416, 1389, 1326, 1277, 1230, 1194, 1099, 1071, 1040, 1007, 890, 847, 806 and 794 cm.$^{-1}$, having an optical rotation [$\alpha$]D of about +116° when dissolved at a concentration of 1% in pyridine, and containing the elements carbon, hydrogen, nitrogen and oxygen in substantially the following proportions by weight:

| | |
|---|---|
| Carbon | 60.43 |
| Hydrogen | 7.93 |
| Nitrogen | 1.94 |
| Oxygen (by difference) | 29.70 | and salts of said rimocidin.

11. Crystalline rimocidin, an amphoteric substance, slightly soluble in water, acetone and lower alcohols, decomposing above about 110° C., displaying maxima in the ultraviolet region of the spectrum at about 279, 291, 303, and 318 m$\mu$, when suspended in a potassium bromide pellet displaying infrared adsorption maxima at about 3413, 2941, 1718, 1631, 1575, 1471, 1416, 1389, 1326, 1277, 1230, 1194, 1099, 1071, 1040, 1007, 890, 847, 806 and 794 cm.$^{-1}$, having an optical rotation [$\alpha$]D of about +116° when dissolved at a concentration of 1% in pyridine, and containing the elements carbon, hydrogen, nitrogen and oxygen in substantially the following proportions by weight:

| | |
|---|---|
| Carbon | 60.43 |
| Hydrogen | 7.93 |
| Nitrogen | 1.94 |
| Oxygen (by difference) | 29.70 | and salts thereof.

12. Crystalline rimocidin, an amphoteric substance, slightly soluble in water, acetone and lower alcohols, decomposing above about 110° C., displaying maxima in the ultraviolet region of the spectrum at about 279, 291, 303, and 318 m$\mu$, when suspended in a potassium bromide pellet displaying infrared adsorption maxima at about 3413, 2941, 1718, 1631, 1575, 1471, 1416, 1389, 1326, 1277, 1230, 1194, 1099, 1071, 1040, 1007, 890, 847, 806, and 794 cm.$^{-1}$, having an optical rotation [$\alpha$]D of about +116° when dissolved at a concentration of 1% in pyridine, and containing the elements carbon, hydrogen, nitrogen and oxygen in substantially the following proportions by weight:

| | |
|---|---|
| Carbon | 60.43 |
| Hydrogen | 7.93 |
| Nitrogen | 1.94 |
| Oxygen (by difference) | 29.70 |

13. A metallic salt of the rimocidin claimed in claim 12.

14. The sodium salt of the rimocidin claimed in claim 12.

15. An acid salt of the rimocidin claimed in claim 12.

16. The sulfate salt of the rimocidin claimed in claim 12.

17. The hydrochloride salt of the rimocidin claimed in claim 12.

18. A triethylamine sulfate complex of the rimocidin claimed in claim 12.

References Cited in the file of this patent

UNITED STATES PATENTS 2,516,080   Sobin et al.   July 18, 1950

OTHER REFERENCES

Waksman et al.: "Actinomycetes and Their Antibiotics," pp. 47–48, 1953, Williams and Wilkins Co., Baltimore, Md.

Bergey's Manual of Determinative Bacteriology, 1948, p. 948, Williams and Wilkins.

Brown et al.: Proc. Soc. Exp. Biol. and Med., 1949, pp. 454–457.

Hazen et al.: Proc. Soc. Exp. Biol. and Med., 1951, pp. 93–97.

Alexopoulos: Ohio J. of Science, 1941, pp. 425–430.

Kochi et al.: Biol. Abst., vol. 27, No. 12, p. 3102, par. 32601.